Jan. 16, 1962     R. L. RIDDIFORD ETAL     3,017,082
DEVICES FOR SENSING PUNCHED CARDS, TAPES OR OTHER MEMBERS
Filed July 29, 1958     3 Sheets-Sheet 1
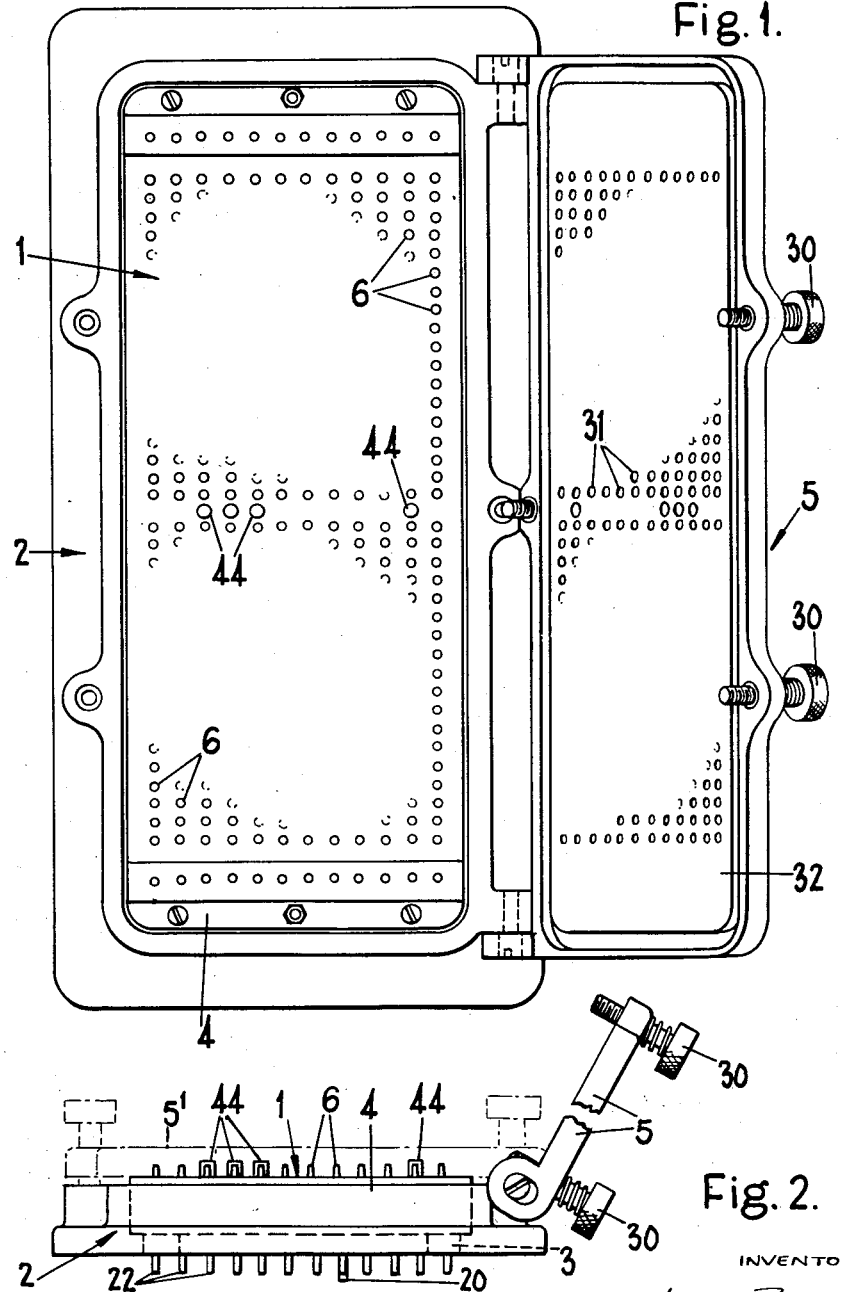
INVENTORS
REGINALD LIONEL RIDDIFORD
FRANK SALISBURY
BY Inschlem, Inschlem & Ottinger
ATTORNEYS

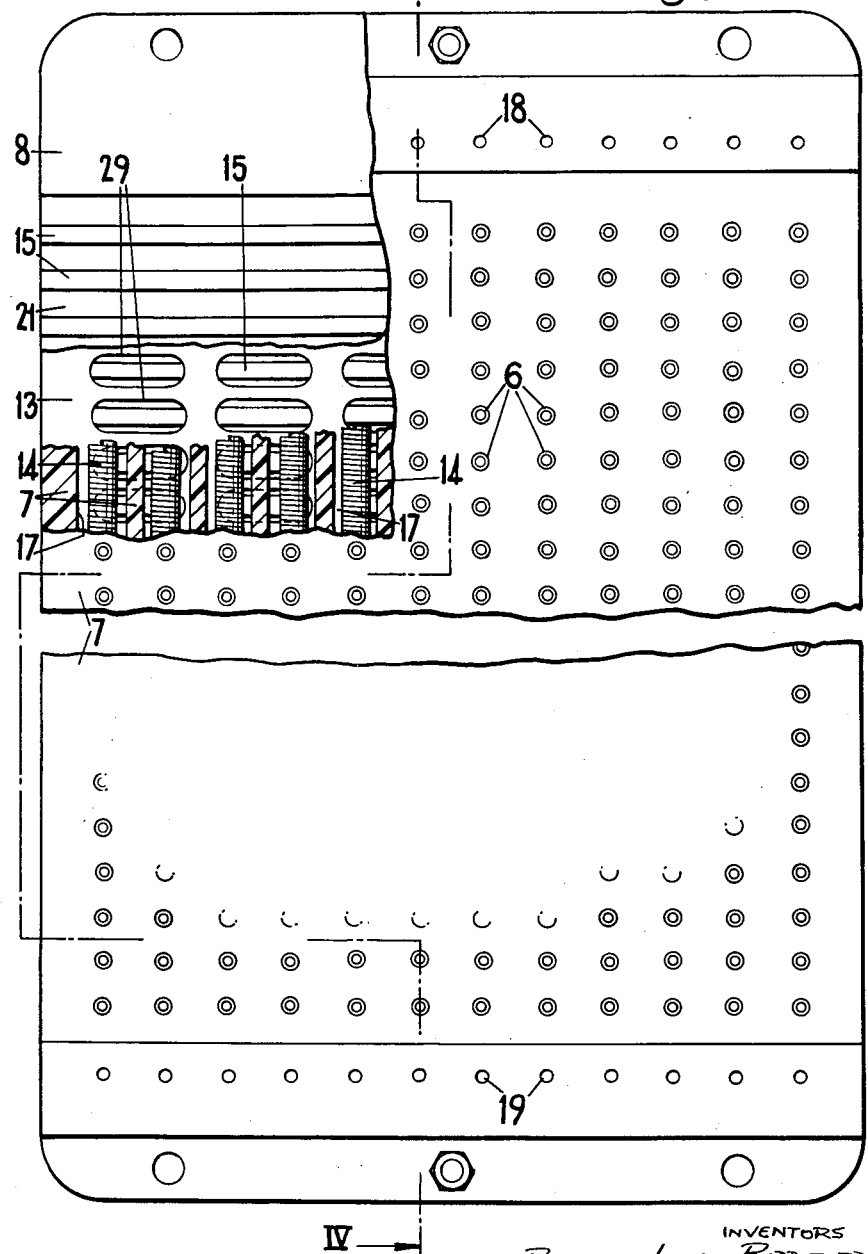

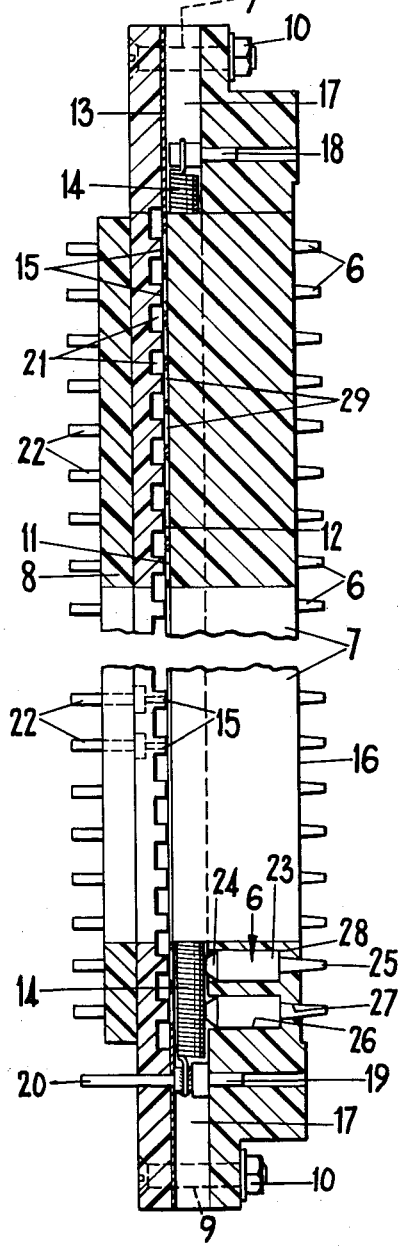
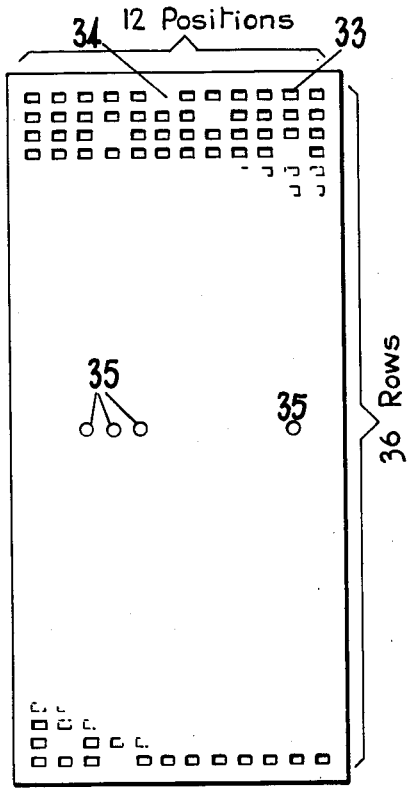
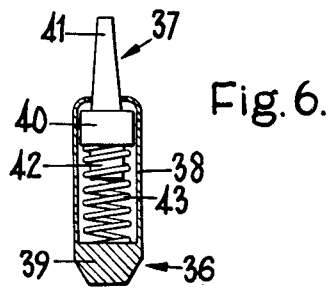

United States Patent Office 3,017,082
Patented Jan. 16, 1962

3,017,082
DEVICES FOR SENSING PUNCHED CARDS, TAPES OR OTHER MEMBERS
Reginald Lionel Riddiford, Birmingham, and Frank Salisbury, Coventry, England, assignors to The General Electric Company Limited, London, England
Filed July 29, 1958, Ser. No. 751,731
Claims priority, application Great Britain August 1, 1957
11 Claims. (Cl. 235—61.11)

This invention relates to devices for sensing punched cards, tapes or other members.

It is well known to make use of punched cards for the purpose of feeding digital information to computers and other apparatus, the cards usually having a plurality of positions at which holes may be punched and the particular pattern of holes in any punched card characterising the information to be supplied.

Hitherto in non-optical sensing devices it has been usual to sense the holes in a card by providing a plurality of moveable electric contacts which are associated one with each of the said positions on the card at which there might be a hole. When a punched card is presented to such a sensing device, each of the moveable contacts associated with the positions at which there are holes passes through the appropriate hole so as to make contact with a further electric contact, thereby setting up an electric circuit. The card thus co-operates with pairs of electric contacts to enable some to be closed and others to be open, the electric circuits that are thereby set up depending on the pattern of holes punched in the card.

One object of the present invention is to provide an improved non-optical sensing device in which the punched card, tape or other member does not co-operate with electric contacts in the manner discussed above.

In a device in accordance with the present invention for sensing a punched card, tape or other member, a part is arranged upon movement thereof to deform an elongated coil or wire and thereby urge it against a surface of a member of electrically conducting material, the said coil and the said member being so arranged that, at least in the region of the parts thereof that may be brought into contact as aforesaid, the longitudinal axis of the coil lies in a plane generally parallel to the said surface of the member and the arrangement being such that, when a card, tape or other member is presented to the device, an end of the said part remote from the said coil either is not in register with a hole in the said card, tape or other member, in which case the part is moved by the card, tape or other member and there is an electrical connection between the coil and the member, or is in register with such a hole and there is no such connection.

Preferably electrically insulating material is provided between the said coil and the said member so as normally to separate them, there being a gap in the said material through which the said coil is urged upon movement of the said part for the purpose of making contact with the said member as aforesaid.

According to a feature of the present invention, a device for sensing a punched card, tape or other member comprises an elongated coil of wire, a plurality of members which are of electrically conducting material and which are insulated from one another, and a plurality of parts which are associated one with each of the said members and which are each arranged upon movement thereof to deform the said coil and urge it into contact with the appropriate member, the arrangement being such that when a card, tape or other member is presented to the device, the end of each of the said parts remote from the said coil either is not in register with a hole in the said card, tape or other member, in which case the part is moved by the card, tape or other member and there is an electrical connection between the coil and the appropriate member, or is in register with such a hole and there is no such connection.

According to another feature of the present invention, a device for sensing a punched card or other member comprises M elongated coils of wire which are each of generally helical form and which are arranged so that the longitudinal axes of the coils are parallel to one another and lie in a plane, N members which are electrically conducting material and which each has a surface portion which lies in a plane that is common to all those portions, this plane being parallel to the previously mentioned plane and each of the said surface portions passing close to each of the coils, and MN parts which are supported to lie on the opposite side of the said coils to the said members and which are arranged upon movement of each part to deform one of said coils and urge into contact with the said surface portion of one of said members, each of the said parts being associated with one coil and one strip so that, by movement of the appropriate part, any one coil can be brought into contact with any one member, and the arrangement being such that when a card, or other member is presented to the device, the end of each of the said parts remote from the said coil either is not in register with a hole in the said card or other member, in which case the part is moved by the card, or other member and there is an electrical connection between the appropriate coil and the appropriate member, or is in register with such a hole and there is no such connection.

In a device in accordance with the present invention, the said part or each of the said parts may be formed by a unitary member or alternatively it may comprise two members which are arranged one to telescope into the other but which are prevented normally from so doing by means of a spring.

One construction of a device in accordance with the present invention for setting up electrical connections in dependence upon the holes in a punched card is for use with a card having four hundred and thirty-two positions at which there may be holes, these four hundred and thirty-two positions being arranged in thirty-six parallel rows each of twelve positions. This device will now be described by way of example with reference to the accompanying drawings in which FIGURES 1 and 2 show plan and end elevation views respectively of the complete device, FIGURE 3 shows an enlarged plan view, partially broken away, of a part of the device, FIGURE 4 shows a sectional elevation at the line IV—IV in FIGURE 3, FIGURE 5 shows a typical punched card for use with the device, and FIGURE 6 shows a sectional elevation of an alternative part that may be used in the device.

Referring to FIGURES 1 and 2, the device comprises a sensing unit 1 which is mounted on a metal base member 2. In fact, the sensing unit 1 is held against a plate portion 3 of the member 2 by means of screws (not shown) which screw in through the back of the plate portion 3 and the member 2 also has a wall portion 4 which completely surrounds the sensing unit 1. A metal cover 5 is hinged to the base member 3.

The sensing unit 1 is provided with four hundred and thirty-two plunger members 6. Although only some of these plunger members 6 are illustrated in FIGURE 1, they are disposed in thirty-six parallel rows which are horizontal in FIGURE 1, each of these rows containing twelve members.

Referring now to FIGURES 3 and 4 which show the sensing unit 1 in more detail, it comprises two plates 7 and 8 of electrically insulating material which are generally rectangular in shape and which are held together by means of screws 9 and nuts 10 so that the major faces 11 and 12 of the two plates are in register with one another and are separated by only a thin member 13 of electrically insulating material. These two plates 7 and 8 in effect constitute a housing in which there are provided twelve like elongated coils 14 of Phosphor-bronze wire and thirty-six copper strips 15.

The coils 14 are of helical form and extend parallel to one another along the major portion of the length of the plates 7 and 8 while the copper strips 15 lie parallel to one another across the plates. Thus, as seen in FIGURE 3, each of the coils 14 crosses all the strips 15 and lies generally at right angles thereto. One of the plunger members 6 is provided at each intersection of a coil 14 and a strip 15.

The plunger members 6 are contained within the plate 7 but they do project slightly beyond the major face 16 of that plate. During use, a punched card, such as that shown in FIGURE 5, is pressed against this face 16 of the plate 7 so that some of the plunger members 6 are depressed. Each plunger member 6 that is depressed in this manner tends to deform the associated coil 14 so as to urge it into contact with the appropriate copper strip 15.

The plates 7 and 8 are in fact of phenolic resin and the plate 7 has twelve slots 17 milled in the face 11 thereof, these slots being arranged to receive the coils 14. Each slot 17 is provided with supporting pins 18 and 19 at the ends thereof and each coil 14 is carried between two such pins so as to be under slight tension. The coils 14 are electrically connected, for example by soldering, to the pins 19 at one end of the plate 7 and these pins 19 pass through the plate 8 so as to form a first group of terminals 20.

The copper strips 15 are provided on the major face 12 of the plate 8 by means of a printed circuit technique. For example, the plate 8 may initially have a copper foil secured all over the face 12, portions of this foil being subsequently etched or machined away to leave the required strips. Slots 21 are milled across the face 12 between the copper strips 15 so as to increase the leakage path between these strips. Thirty-six pins 22 pass through the plate 8 and are connected, for example by soldering, each to one of the strips 15, these pins 22 constituting a second group of terminals of the device.

The plunger members 6 are of brass and each consists of a cylindrical portion 23 which tapers at one end into a frusto-conical portion 24 while at the other end, there is a frusto-conical portion 25 which is considerably longer than the portion 24 but generally of somewhat smaller cross-section. The central portion 23 is a loose fit in a cylindrical hole 26 in the plate 7, the longitudinal axis of this hole lying perpendicular to the longitudinal axis of the adjacent coil 14 and to the associated strip 15. The frusto-conical portion 25 projects through a hole 27 in the plate 7, this hole 27 being a continuation of the hole 26 but being of somewhat smaller diameter. Each plunger member 6 is thus held captive between the appropriate coil 14 which touches the end surface of the portion 24 and the annular shoulder 28 formed between the bottom of the appropriate hole 26 in which lies the central portion 23 of the member.

As previously mentioned, a thin member 13 of electrically insulating material is clamped between the plates 7 and 8. This member 13 is provided with a plurality of apertures 29 which enable the required connections to be made between the coils 14 and the strips 15 when some of the plunger members 6 are depressed, but which serves normally to hold the coils away from the strips. In the example being described, each of these apertures 29 is so shaped that although on one side it is in register with only a single strip 15, on the other side it is in register with two coils 14. Alternatively the member 13 may have a separate aperture associated with each plunger member 6.

When the device described above is in use, a punched card such as that shown in FIGURE 5 is pressed against the face 16 of the plate 7, the necessary pressure being obtained by means of the cover 5 when in its closed position. This position of the cover 5 is shown in broken outline 5' in FIGURE 2 and is locked in that position by means of screws 30. The cover 5 has four hundred and thirty-two recesses 31 (only some of which are shown in FIGURE 1) in its inner surface 32, these recesses being located so that when the cover 5 is closed, the recesses are in register with the plunger members 6. Thus if the cover 5 were to be closed when there was no punched card in position, the portion 25 of each of the plunger members 6 would project into the appropriate recess 31 in the cover 5 with the result that none of the plunger members would be depressed by the cover itself.

When, however, a punched card is pressed against the sensing unit 1 by the cover 5, each of those plunger members 6 which is at a position where there is no hole in the card, is accordingly depressed so as to make electrical connection between the appropriate coil 14 and the appropriate strip 15. Those plunger members 6 that are in register with holes in the card are not moved since the portion 25 of each of these plunger members passes through the appropriate hole in the card into the corresponding recess 31 in the cover 5.

As shown in FIGURE 5, eleven of the possible twelve positions in each row of such positions on the card are punched so that the card causes each of the terminals 22 to be connected to one and only one of the terminals 20. Thus on the top row there are eleven holes 33 while the position 34 is unpunched.

The thirty-six rows of positions on the card at which holes 33 may be punched, are divided up into two groups each of eighteen rows, these groups being separated by four somewhat larger holes 35. These holes 35 engage with pegs 44 projecting up from the plate 7 and ensure that a card cannot be presented to the device the wrong way round.

Instead of forming the copper strips 15 by a printed circuit technique from a copper clad board, the plate 8 may be a phenolic resin board in which parallel grooves are milled. A copper wire is then cemented in each of these grooves and the wire is itself milled so as to form an undercut surface. This plate 8 is then bolted to the plate 7 without the provision of an intermediate insulating member and it will be realised that the portions of the plate 8 which extend above the milled surfaces of the wires prevent the coils 14 touching the wires until the appropriate plunger members 6 are depressed.

The coils 14 and the strips 15 may be arranged to be sealed against the ingress of moisture which might affect the electrical performance of the sensing device. The plunger members 6 may then conveniently be outside the sealed region by providing a thin sheet of plastic material, which constitutes one wall of the sealed region, between the coils 14 and the adjacent ends of the plunger members 6.

Instead of being of unitary construction, each of the plunger members 6 may, referring now to FIGURE 6, be replaced by an assembly which comprises two brass members 36 and 37. The member 36 is formed by a hollow cylindrical portion 38 and a solid frusto-conical portion 39. The member 37 comprises a central cylindrical portion 40 which is a loose fit within the cylindrical portion 38 of the member 36, a frusto-conical portion 41 and a further cylindrical portion 42 which is of somewhat smaller cross-section than the portion 40. The open end of the portion 38 of the member 36 is peined over so as to hold captive the portion 40 of the member 37 while a helical spring 43 at one end embraces the cylindrical portion 42 of the member 37 and is held in compression between the bottom of the hollow cylindrical portion 38 of the member 36 and the portion 40 of the member 37.

This plunger assembly is thus capable of telescoping from its normal position when pressure is applied between the ends thereof and in the sensing device this serves to reduce the maximum pressure that can be applied to the coils 14.

We claim:

1. A device for sensing a punched card, tape or other member comprising an elongated member of electrically conducting material, an elongated coil of wire extending across said member, means to mount said coil so that one side of a portion thereof is close to said member, a part, and means to movably mount said part on the opposite side of said portion of the coil to said member so that, when a card, tape or other member is presented to the device, an end of the said part remote from said coil either is not in register with a hole in said card, tape or other member, in which case the part is moved by the card, tape or other member and there is an electrical connection between the coil and the member, or is in register with such a hole and there is no such connection.

2. A device according to claim 1 wherein electrically insulating material is provided between the said coil and the said member so as normally to separate them, there being a gap in the said material through which the said coil is urged upon movement of the said part for the purpose of making contact with the said member as aforesaid.

3. A device according to claim 1 wherein the said part is formed by a unitary member.

4. A device according to claim 1 wherein the said part comprises two members which are arranged one to telescope into the other but which are prevented normally from so doing by means of a spring.

5. A device for sensing a punched card, tape or other member comprising an elongated coil of wire, a plurality of members which are of electrically conducting material and which are insulated from one another, and a plurality of parts which are associated one with each of the said members and which are each arranged upon movement thereof to deform the said coil and urge it into contact with the appropriate member, the arrangement being such that when a card, tape or other member is presented to the device, the end of each of the said parts remote from the said coil either is not in register with a hole in the said card, tape or other member, in which case the part is moved by the card, tape or other member and there is an electrical connection between the coil and the appropriate member, or is in register with such a hole and there is no such connection.

6. A device according to claim 5 wherein electrically insulating material is provided between the said coil and the said members so as normally to separate them, there being gaps in the said material through which the said coil may be urged upon movement of the said parts for the purpose of making contact with the said members as aforesaid.

7. A device according to claim 5 wherein each of said parts is formed by a unitary member.

8. A device according to claim 5 wherein each of said parts comprises two members which are arranged one to telescope into the other but which are prevented normally from so doing by means of a spring.

9. A device for sensing a punched card, or other member comprising M elongated coils of wire which are each of generally helical form and which are arranged so that the longitudinal axes of the coils are parallel to one another and lie in a plane, N members which are electrically conducting material and which each has a surface portion which lies in a plane that is common to all those portions, this plane being parallel to the previously mentioned plane and each of the said surface portions passing close to each of the coils, and MN parts which are supported to lie on the opposite side of the said coils to the said members and which are arranged upon movement of each part to deform one of said coils and urge into contact with the said surface portion of one of said members, each of the said parts being associated with one coil and one strip so that, by movement of the appropriate part, any one coil can be brought into contact with any one member, and the arrangement being such that when a card or other member is presented to the device, the end of each of the said parts remote from the said coil either is not in register with a hole in the said card or other member, in which case the part is moved by the card or other member and there is an electrical connection between the appropriate coil and the appropriate member, or is in register with such a hole and there is no such connection.

10. A device according to claim 9 wherein there is provided a further member having a surface against which a card or other member is urged during operation of the device, the said parts each normally lying mainly within the said member but having a portion which projects beyond the said surface.

11. A device according to claim 10 wherein there is a cover which is arranged to urge a card or other member against the said surface of the said further member and which has recesses corresponding one to each of said parts, each of these recesses serving to receive the said portion of the appropriate part when that part is not moved by a card or other member as aforesaid.

References Cited in the file of this patent

UNITED STATES PATENTS

| | | |
|---|---|---|
| 677,214 | Hollerith | June 25, 1901 |
| 2,890,828 | Stark et al. | June 16, 1959 |